US012780171B2

(12) United States Patent
Ståhl et al.

(10) Patent No.: US 12,780,171 B2
(45) Date of Patent: Nov. 3, 2026

(54) METHOD OF CONTROLLING OPERATION OF A VEHICLE, COMPUTER PROGRAM, COMPUTER-READABLE MEDIUM, CONTROL ARRANGEMENT, AND VEHICLE

(71) Applicant: Scania CV AB, Södertälje (SE)

(72) Inventors: Daniel Ståhl, Enköping (SE); Martin Berglund, Vagnhärad (SE); Aron Nygren, Älta (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 19/077,497

(22) Filed: Mar. 12, 2025

(65) Prior Publication Data

US 2025/0296546 A1 Sep. 25, 2025

(30) Foreign Application Priority Data

Mar. 25, 2024 (SE) .................................... 2450324-5

(51) Int. Cl.
*B60W 10/115* (2012.01)
*B60W 30/18* (2012.01)
(Continued)

(52) U.S. Cl.
CPC .... *B60W 10/115* (2013.01); *B60W 30/18027* (2013.01); *F16H 59/44* (2013.01);
(Continued)

(58) Field of Classification Search
CPC ...... F16H 61/10; F16H 2312/02; F16H 59/44; F16H 59/48; F16H 2059/366; F16H 59/40; B60W 10/11; B60W 10/115; B60W 30/18027; B60W 30/14; B60W 30/8143; B60W 30/146; B60W 30/162;
(Continued)

(56) References Cited

U.S. PATENT DOCUMENTS 5,406,862 A * 4/1995 Amsallen ............ F16H 61/0213 477/901
5,662,548 A * 9/1997 Mori .................. F16H 61/0213 477/905

(Continued)

OTHER PUBLICATIONS

Scania CV AB, Swedish Patent Application No. 2450324-5, Swedish Search Report, Oct. 11, 2024.

(Continued)

*Primary Examiner* — Roger L Pang
(74) *Attorney, Agent, or Firm* — Moore and Van Allen PLLC; W. Kevin Ransom

(57) ABSTRACT

A method of controlling operation of a vehicle is disclosed, wherein the vehicle comprises a transmission and a power source operably connected to driven wheels of the vehicle via the transmission. The transmission is controllable between at least two different gears to provide at least two different transmission ratios between the power source and the driven wheels of the vehicle. The method comprises the steps of selecting a starting gear in the transmission based on an inputted target speed, and then accelerating the vehicle from standstill with the starting gear engaged in the transmission. The present disclosure further relates to a computer program, a computer-readable medium, a control arrangement, and a vehicle.

19 Claims, 2 Drawing Sheets

(51) Int. Cl.
*F16H 59/44* (2006.01)
*F16H 61/10* (2006.01)
*F16H 59/48* (2006.01)

(52) U.S. Cl.
CPC ....... *F16H 61/10* (2013.01); *B60W 2300/125* (2013.01); *B60W 2520/10* (2013.01); *B60W 2554/406* (2020.02); *B60W 2555/60* (2020.02); *B60W 2556/40* (2020.02); *B60W 2556/45* (2020.02); *B60W 2710/1005* (2013.01); *B60W 2710/1038* (2013.01); *F16H 59/48* (2013.01); *F16H 2312/02* (2013.01)

(58) Field of Classification Search
CPC ... B60W 2510/0638; B60W 2300/125; B60W 2520/10; B60W 2554/406; B60W 2555/60; B60W 2556/40; B60W 2556/45; B60W 2710/1005; B60W 2710/1038
USPC ...................................................... 701/22, 51
See application file for complete search history.

(56) References Cited

U.S. PATENT DOCUMENTS

| | | | | |
|---|---|---|---|---|
| 2010/0185370 | A1 | 7/2010 | Wurthner et al. | |
| 2012/0296534 | A1 | 11/2012 | Juhlin-Dannfelt et al. | |
| 2013/0040781 | A1 | 2/2013 | Mair | |
| 2016/0229400 | A1 | 8/2016 | Bjernetun et al. | |
| 2019/0100206 | A1 * | 4/2019 | Liwell .................... | B60K 6/387 |

OTHER PUBLICATIONS

Scania CV AB, Swedish Patent Application No. 2450324-5, Office Action, Oct. 11, 2024.

* cited by examiner

METHOD OF CONTROLLING OPERATION OF A VEHICLE, COMPUTER PROGRAM, COMPUTER-READABLE MEDIUM, CONTROL ARRANGEMENT, AND VEHICLE

CROSS-REFERENCE TO RELATED APPLICATIONS

This application claims priority to Swedish Patent Application No. 2450324-5 filed March 25, 2024, of the same title; the contents of which are hereby incorporated by reference.

TECHNICAL FIELD

The present disclosure relates to a method of controlling operation of a vehicle. The present disclosure further relates to a computer program, a computer-readable medium, a control arrangement configured to control operation of a vehicle, as well as a vehicle comprising a control arrangement.

BACKGROUND

Vehicles have traditionally been powered using an internal combustion engine. However, the current trend is towards the use of electric drive for vehicles which provides many advantages, especially regarding local emissions. Such vehicles comprise one or more electric machines configured to provide motive power to the vehicle. These types of vehicles can be divided into the categories pure electric vehicles and hybrid electric vehicles. Pure electric vehicles, sometimes referred to as battery electric vehicles, only-electric vehicles, and all-electric vehicles, comprise a pure electric powertrain and comprise no internal combustion engine and therefore produce no emissions in the place where they are used.

A hybrid electric vehicle comprises two or more distinct types of power sources, such as an internal combustion engine and an electric propulsion system. The combination of an internal combustion engine and an electric propulsion system provides advantages with regard to energy efficiency, partly because of the poor energy efficiency of an internal combustion engine at lower power output levels. Moreover, some hybrid electric vehicles are capable of operating in pure electric drive when wanted, such as when driving in certain areas.

In at least partially electric vehicles, such as in pure electric vehicles and hybrid electric vehicles, the electricity is usually stored in a number of battery packs each comprising a number of rechargeable battery cells. Some different types of battery cells are used, such as lithium-ion battery cells, lithium polymer battery cells, lithium iron phosphate battery cells, as well as other types of rechargeable battery cells. Moreover, some vehicles are equipped with fuel cells capable of converting hydrogen to electricity. These fuel cells generate electricity through a chemical reaction between hydrogen and oxygen, which can complement or replace the use of rechargeable battery packs in supporting the vehicle's electrical systems and propulsion.

Many vehicles comprise a transmission between the power source, i.e., the internal combustion engine or the electric machine, and driven wheels of the vehicle, wherein the transmission is controllable between at least two different gears to provide at least two different transmission ratios between the power source and the driven wheels of the vehicle.

A controllable transmission between a power source and the driven wheels of the vehicle allows for advantages in terms of performance, efficiency, and driving experience. Firstly, by enabling the selection of different gears, the vehicle can adapt its performance to the driving conditions. At low speeds, using a lower gear increases the torque available at the wheels, which is particularly useful for starting from a standstill or climbing steep slopes.

Secondly, at higher speeds, selecting a higher gear reduces the engine or motor's revolutions per minute (RPM). This reduction is crucial for enhancing fuel efficiency in internal combustion engines and extending the battery life in electric vehicles by minimizing energy consumption. It also contributes to a quieter and more comfortable ride, as the lower RPM reduces engine/motor noise and vibration.

Furthermore, the ability to switch gears allows the vehicle to operate within an optimal power band of the power source. This means the power source can work in its most efficient range which can enhance fuel efficiency or energy use.

However, during a gear shift, a temporary loss of power transfer occurs between the power source and the driven wheels during the process of changing gears. This interruption happens because, in order to shift gears, the connection between the power source and the transmission must be momentarily disengaged.

During acceleration phases, torque interruption can lead to a noticeable break in the delivery of power, making the vehicle momentarily feel less responsive. This can affect driving comfort, as the smoothness of acceleration is disrupted. Drivers may feel a jolt or a sense of hesitation as the transmission shifts, which can be particularly pronounced during rapid acceleration or when ascending steep inclines where consistent power delivery may be more important. Moreover, a gear shift occurring during an acceleration phase of the vehicle may increase the time needed to accelerate the vehicle to a certain speed due to the torque interruption during the gear shift.

SUMMARY

It is an object of the present invention to overcome, or at least alleviate, at least some of the above-mentioned problems and drawbacks. The object is achieved by the subject-matter of the appended independent claim(s).

According to a first aspect of the present disclosure, the object is achieved by a method of controlling operation of a vehicle, wherein the method is performed by a control arrangement, and wherein the vehicle comprises a transmission and a power source operably connected to driven wheels of the vehicle via the transmission. The transmission is controllable between at least two different gears to provide at least two different transmission ratios between the power source and the driven wheels of the vehicle.

The method comprises the steps of:
- selecting a starting gear in the transmission based on an inputted target speed, and then
- accelerating the vehicle from standstill with the starting gear engaged in the transmission.

As a result, a method is provided capable of enhancing the comfort, smoothness, and driveability during acceleration phases of the vehicle. This is because the method comprises the step of selecting the starting gear in the transmission based on the inputted target speed, and then accelerating the vehicle from standstill with the starting gear engaged in the transmission. That is, by selecting the starting gear in the transmission based on the inputted target speed, conditions are provided for reducing, and potentially eliminating, the need for performing gear shifts during acceleration of the vehicle to the target speed. As a result, the comfort, smoothness, and driveability of the vehicle can be improved.

Accordingly, a method is provided overcoming, or at least alleviating, at least some of the above-mentioned problems and drawbacks. As a result, the above-mentioned object is achieved.

Optionally, the method comprises:

selecting the starting gear to reduce the number of gear shifts needed for reaching the target speed.

By selecting the starting gear in the transmission based on the inputted target speed for reducing the number of gear shifts needed to reach the target speed, conditions are provided for reducing, and potentially eliminating, the need for performing gear shifts during acceleration of the vehicle to the target speed. As a result, the comfort, smoothness, and driveability of the vehicle can be further ensured.

Optionally, the step of accelerating the vehicle comprises:

accelerating the vehicle from standstill to the target speed with the starting gear engaged in the transmission.

Thereby, a method is provided eliminating the need for performing gear shifts during acceleration of the vehicle from standstill to the target speed. That is, by selecting a starting gear in the transmission based on the inputted target speed and then accelerate the vehicle from standstill to the target speed with the starting gear engaged in the transmission, the comfort, smoothness, and driveability of the vehicle can be further ensured.

Optionally, the step of selecting the starting gear comprises:

selecting the starting gear based on a calculated rotational speed of the power source when the vehicle reaches the target speed with the selected starting gear.

Thereby, a method is provided capable of improving the comfort, smoothness, and driveability of the vehicle while providing conditions for ensuring energy efficiency, and/or performance, of the vehicle during the acceleration to the target speed.

Optionally, the method comprises the step of:

performing an upshift in the transmission when the vehicle has reached the target speed.

Thereby, a method is provided capable of improving the comfort, smoothness, and driveability of the vehicle while providing conditions for ensuring energy efficiency of the vehicle when the vehicle has reached the target speed.

Optionally, the method comprises the step of:

abstaining from performing an upshift in the transmission at a default upshift speed during acceleration of the vehicle to the target speed if a difference between the default upshift speed and the target speed is below a threshold difference.

Thereby, a method is provided capable of enhancing comfort and smoothness during acceleration phases of the vehicle. This is because by abstaining from performing the upshift if the difference between the default upshift speed and the target speed is equal to, or below, the threshold difference, a smoother, more controlled, and more comfortable acceleration to the target speed can be obtained. Furthermore, by abstaining from performing the upshift if the difference between the default upshift speed and the target speed is equal to, or below, the threshold difference, the target speed can be reached in a shorter time.

Optionally, the method comprises the step of:

inputting a vehicle acceleration demand, and wherein the step of selecting the starting gear comprises:

selecting the starting gear in the transmission based on the inputted target speed and the inputted vehicle acceleration demand.

Thereby, an adaptive method is provided capable of enhancing the comfort, smoothness, and driveability of the vehicle, while ensuring performance of the vehicle.

Optionally, the step of selecting the starting gear involves:

skipping a lower gear which is configured to provide a higher transmission ratio between the power source and the driven wheels than the selected starting gear.

Thereby, a method is provided capable of enhancing the comfort, smoothness, and driveability during acceleration phases of the vehicle while providing conditions for an energy efficient operation of the vehicle. This is because the lower transmission ratio of the selected starting gear, as compared to the skipped lower gear, provides conditions for an energy efficient operation of the power source of the vehicle during acceleration towards the target speed.

Optionally, the method comprises the step of:

inputting the target speed from an at least partially autonomous driving system of the vehicle.

Thereby, an adaptive method is provided capable of enhancing the comfort, smoothness, and driveability of the vehicle based on data from the at least partially autonomous driving system of the vehicle.

The at least partially autonomous driving system may be a cruise control system, an adaptive cruise control system, a semi-autonomous driving system, or a fully autonomous driving system.

Optionally, the method comprises the step of inputting the target speed using at least one of:

speed limit data,
map data,
curve speed cruise information,
traffic information,
data from an external sender, and
traffic light information.

Thereby, an adaptive method is provided capable of enhancing the comfort, smoothness, and driveability of the vehicle.

According to a second aspect of the present disclosure, the object is achieved by a computer program comprising instructions to cause the control arrangement according to the second aspect of the present disclosure to execute the steps of the method according to some embodiments of the first aspect of the present disclosure. Since the computer program comprises instructions to cause the control arrangement to carry out the method according to some embodiments described herein, a computer program is provided which provides conditions for overcoming, or at least alleviating, at least some of the above-mentioned drawbacks. As a result, the above-mentioned object is achieved.

According to a third aspect of the present disclosure, the object is achieved by a computer-readable medium having stored thereon the computer program according to the second aspect of the present disclosure. Since the computer-readable medium comprises instructions to cause the control arrangement to carry out the method according to some embodiments described herein, a computer-readable medium is provided which provides conditions for overcoming, or at least alleviating, at least some of the above-mentioned drawbacks. As a result, the above-mentioned object is achieved.

According to a fourth aspect of the present disclosure, the object is achieved by a control arrangement configured to control operation of a vehicle, wherein the vehicle comprises a transmission and a power source operably connected to driven wheels of the vehicle via the transmission, wherein the transmission is controllable between at least two different gears to provide at least two different transmission ratios between the power source and the driven wheels of the vehicle. The control arrangement is configured to:

select a starting gear in the transmission based on an inputted target speed, and then accelerate the vehicle from standstill with the starting gear engaged in the transmission.

As a result, a control arrangement is provided capable of enhancing the comfort, smoothness, and driveability during acceleration phases of the vehicle. This is because the control arrangement is configured to select the starting gear in the transmission based on the inputted target speed, and then accelerate the vehicle from standstill with the starting gear engaged in the transmission. That is, by selecting the starting gear in the transmission based on the inputted target speed, conditions are provided for reducing, and potentially eliminating, the need for performing gear shifts during acceleration of the vehicle to the target speed. As a result, the comfort, smoothness, and driveability of the vehicle can be improved.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

According to a fifth aspect of the present disclosure, the object is achieved by a vehicle comprising a transmission and a power source operably connected to driven wheels of the vehicle via the transmission, and wherein the vehicle comprises a control arrangement according to the fourth aspect of the present disclosure.

Since the vehicle comprises a control arrangement according to the fourth aspect of the present disclosure, a vehicle is provided overcoming, or at least alleviating, at least some of the above-mentioned problems and drawbacks. As a result, the above-mentioned object is achieved.

Optionally, the power source is an electric machine. Thereby, a vehicle is provided in which a selection of a starting gear other than a default starting gear may have a lower impact on energy efficiency, performance, sound, and vibration as compared to a selection of a starting gear other than a default starting gear of a vehicle comprising a power source in the form of an internal combustion engine.

Optionally, the transmission is an automated manual transmission. Thereby, an energy efficient transmission is provided having conditions for low parasitic losses, while also enabling an efficient control of operation of the vehicle by the control arrangement.

Optionally, the vehicle is a heavy road vehicle, such as a truck or a bus. Thereby, a heavy road vehicle is provided having at least some of the above-mentioned advantages.

Further features of, and advantages with, the present invention will become apparent when studying the appended claims and the following detailed description.

BRIEF DESCRIPTION OF THE DRAWINGS

Various aspects of the present disclosure, including its particular features and advantages, will be readily understood from the example embodiments discussed in the following detailed description and the accompanying drawings, in which.

DETAILED DESCRIPTION

Aspects of the present disclosure will now be described more fully. Like reference signs refer to like elements throughout. Well-known functions or constructions will not necessarily be described in detail for brevity and/or clarity.

Figure 1:
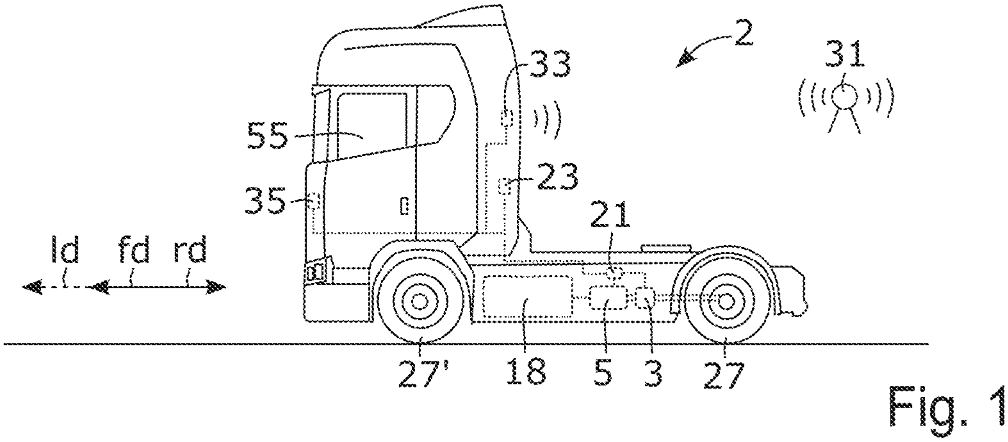
FIG. 1 schematically illustrates a vehicle according to some embodiments.

FIG. 1 schematically illustrates a vehicle 2 according to some embodiments. According to the illustrated embodiments, the vehicle 2 is a truck, i.e., a type of heavy road vehicle, as well as a type of heavy commercial vehicle. According to further embodiments, the vehicle 2, as referred to herein, may be another type of heavy or lighter type of manned or unmanned vehicle for land-based propulsion such as a lorry, a bus, a construction vehicle, a tractor, a car, or the like.

The vehicle 2 comprises a transmission 3 and a power source 5. The power source 5 is operably connected to driven wheels 27 of the vehicle 2 via the transmission 3. In other words, the power source 5 is configured to provide motive power to the vehicle 2 via the transmission 3 and the driven wheels 27 of the vehicle 2. According to the illustrated embodiments, the vehicle 2 comprises two driven wheels 27 which constitute rear-wheels of the vehicle 2. The vehicle 2 further comprises two non-driven wheels 27', which according to the illustrated embodiments constitute front-wheels of the vehicle 2. However, according to further embodiments, the vehicle 2 may comprise another configuration of driven and non-driven wheels.

According to the illustrated embodiments, the power source 5 is an electric propulsion machine. Moreover, according to the illustrated embodiments, the vehicle 2 is a pure electric vehicle comprising the electric propulsion machine as the only means of providing motive power to the vehicle 2 and no internal combustion engine. However, according to further embodiments, the vehicle 2 may be a so called hybrid electric vehicle comprising an internal combustion engine in addition to the electric propulsion machine for providing motive power to the vehicle 2.

According to the illustrated embodiments, the vehicle 2 comprises an electrical energy storage system 18 configured to store electrical energy. The power source 5 is configured to operate using electricity from the electrical energy storage system 18. The electrical energy storage system 18 may comprise a number of battery packs each comprising a number of rechargeable battery cells, such as lithium-ion battery cells, lithium polymer battery cells, lithium iron phosphate battery cells, or the like. As an alternative, or in addition, the vehicle 2 may comprise a pressure tank, such as a cryogenic pressure tank, configured to store hydrogen gas. According to such embodiments, the vehicle 2 may comprise one or more fuel cells configured to generate electricity through a chemical reaction between hydrogen from the pressure tank and oxygen. The power source 5 of the vehicle 2 may be configured to operate using electricity from such one or more fuel cells.

However, according to some further embodiments of the present disclosure, the power source 5, as referred to herein, is an internal combustion engine. The internal combustion engine may be a diesel engine, i.e. a type of compression ignition engine. The internal combustion engine may thus be configured to operate on diesel or a diesel-like fuel, such as biodiesel, biomass to liquid (BTL), or gas to liquid (GTL) diesel. Diesel-like fuels, such as biodiesel, can be obtained from renewable sources such as vegetable oil which mainly comprises fatty acid methyl esters (FAME). Diesel-like fuels can be produced from many types of oils, such as rapeseed oil (rapeseed methyl ester, RME) and soybean oil (soy methyl ester, SME).

According to further embodiments, the internal combustion engine may be an Otto engine with a spark-ignition device, wherein the Otto engine is configured to run on petrol, alcohol, a gaseous fuel, or combinations thereof. Alcohol, such as ethanol, can be derived from renewable biomass.

The gaseous fuel may also be referred to as fuel gas and may encompass any type of fuel that under ordinary ambient temperature and pressure conditions are gaseous and which can be stored at pressure in a pressure tank and can be combusted in an internal combustion engine to produce useful work. Examples of such gaseous fuels are compressed natural gas (CNG), liquified natural gas (LNG), Liquefied Petroleum Gas (LPG), Hydrogen (H2), Biogas, and Syngas. Many gaseous fuels can be derived from renewable sources, such as from renewable biomass. According to embodiments herein, the internal combustion engine may be a four-stroke internal combustion engine.

In FIG. 1, a forward moving direction fd and a reverse moving direction rd of the vehicle 2 are indicated. The reverse moving direction rd is opposite to the forward moving direction fd of the vehicle 2. Each of the forward and reverse moving directions fd, rd is parallel to a longitudinal direction Id of the vehicle 2.

The transmission 3 is controllable between at least two different gears to provide at least two different transmission ratios between the power source 5 and the driven wheels 27 of the vehicle 2. The at least two different transmission ratios may also be referred to as at least two different gear steps or at least two different gear ratios. The transmission 3, as referred to herein, may also be referred to as a gearbox. A transmission ratio between the power source 5 and the driven wheels 27 of the vehicle 2, as referred to herein, may be equated with a transmission ratio between an output shaft of the power source 5 and the driven wheels 27 of the vehicle 2.

According to the illustrated embodiments, the transmission 3 is an automated manual transmission, usually abbreviated AMT. An automated manual transmission combines the efficiency of a manual transmission with the convenience of an automatic transmission. Contrary to traditional automatic transmissions that employ torque converters and planetary gearsets, an automated manual transmission features a gearbox with a gear layout, and a mechanical gear engagement and disengagement process, similar to that of a manual transmission.

Moreover, an automated manual transmission may comprise a clutch controllable to disengage an input shaft of the gearbox from an output shaft of the power source 5. The automated manual transmission may further comprise a number of actuators controllable to execute clutch movements of the clutch and gear shifts via gear shifting linkages, thereby removing the need for the driver to manually operate a clutch pedal or gear lever.

Furthermore, in embodiments in which the power source 5 comprises an electric propulsion machine, the automated manual transmission may lack a clutch. Instead, gear shifts may be performed by controlling the power output of the electric propulsion machine while controlling the gear shifting linkages of the automated manual transmission.

Moreover, according to some embodiments, the transmission 3, as referred to herein, may be an automatic transmission of conventional type, commonly abbreviated as AT, which comprises a torque converter and planetary gearsets. The torque converter in such an automatic transmission serves as a fluid coupling that replaces the clutch, allowing the power source 5 to stay running while the vehicle is stationary. The torque converter also provides the ability to multiply torque under acceleration. The planetary gearsets commonly comprises a central sun gear, planet gears that revolve around the sun gear, and a ring gear that encompasses the planet gears, to offer a range of selectable gears. Moreover, this type of automatic transmission is normally equipped with a hydraulic control system that manages the operation of the torque converter and the engagement of the planetary gearsets.

As indicated in FIG. 1, the vehicle 2 comprises a control arrangement 21. The control arrangement 21 is operably connected to the transmission 3 and to the power source 5 as is indicated in FIG. 1.

Moreover, as indicated in FIG. 1, the vehicle 2 comprises a sensor assembly 35. The sensor assembly 35 is operably connected to the control arrangement 21. According to the illustrated embodiments, the sensor assembly 35 is configured to monitor a driving environment in front of the vehicle 2. The sensor assembly 35 may comprise one or more of an image capturing device, such as a camera, a LiDAR (Light Detection and Ranging) sensor, a radar (Radio Detection and Ranging) sensor, and an ultrasonic sensor.

An image capturing device works by capturing visual data in the form of images or videos. This allows the control arrangement 21 to identify and interpret various aspects of the driving environment, as well as tracking the position and movement of a preceding vehicle. LiDAR sensors function by emitting pulsed laser light and measuring the time it takes for the light to bounce back after hitting an object. This data can be used to create accurate, three-dimensional information about the surrounding environment, including a distance and shape of objects, like a preceding vehicle. Radar sensors use radio waves to detect objects and determine their speed and distance. They emit radio waves that reflect off objects and return to the sensor, allowing the system to calculate the object's position and velocity, even in poor visibility conditions. Lastly, ultrasonic sensors work by emitting ultrasonic sound waves. These waves reflect off objects and return to the sensor, which then calculates the distance to the object based on the time it takes for the sound waves to return.

Moreover, in FIG. 1, an at least partially autonomous driving system 23 of the vehicle 2 is indicated. According to the illustrated embodiments, the at least partially autonomous driving system 23 is operably connected to the sensor assembly 35 and to the control arrangement 21. The at least partially autonomous driving system 23 may be configured to control the speed of the vehicle 2, and/or steering of the vehicle 2, based on data from the sensor assembly 35.

The at least partially autonomous driving system 23 may be a fully or partly autonomous driving system capable of driving the vehicle 2 in an at least partially autonomous manner based on the input from a sensor assembly 35. Moreover, the at least partially autonomous driving system 23, as referred to herein, may be a cruise control system, an adaptive cruise control system, a semi-autonomous driving system, or a fully autonomous driving system.

Furthermore, according to the illustrated embodiments, the vehicle 2 comprises a communication device 33 operably connected to the control arrangement 21. The communication device 33 is configured to receive data from an external sender 31, as is further explained below.

Figure 2:
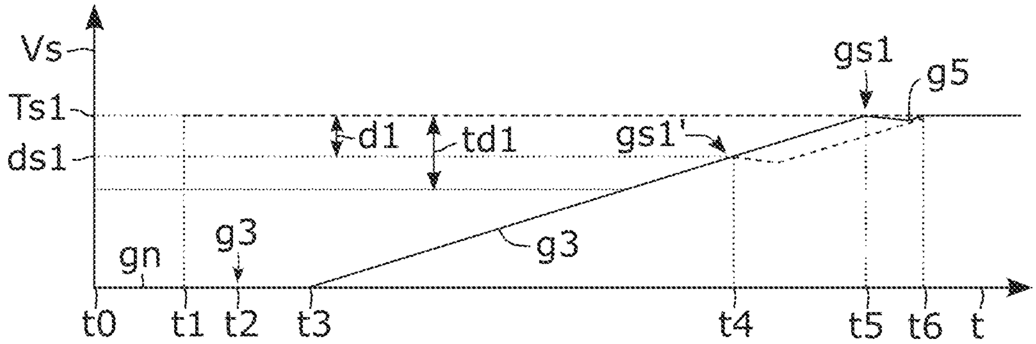
FIG. 2 illustrates a first graph with a horizontal axis indicating time and a vertical axis indicating a speed of the vehicle illustrated in FIG. 1.

FIG. 2 illustrates a first graph with a horizontal axis indicating time t and a vertical axis indicating a speed Vs of the vehicle 2 illustrated in FIG. 1. Below, simultaneous reference is made to FIG. 1 and FIG. 2, if not indicated otherwise.

A number of points in time t0-t6 is indicated in FIG. 2. At the indicated point in time t0, the vehicle 2 is at standstill and a neutral gear gn is engaged in the transmission 3. The feature that the vehicle 2 is at standstill means that the vehicle 2 has zero speed Vs relative to a ground surface currently supporting the vehicle 2.

According to embodiments herein, the control arrangement 21 is configured to input a target speed Ts1. At the indicated point in time t1, the control arrangement 21 inputs a target speed Ts1 and a vehicle acceleration demand. The target speed Ts1 and the vehicle acceleration demand may be inputted from the at least partially autonomous driving system 23, from the communication device 33, or from another type of device or system of the vehicle 2, such as a device or system comprising an input unit arranged in a driver environment 55 of the vehicle 2. These aspects are explained in more detail below.

According to embodiments herein, the control arrangement 21 is configured to select a starting gear g3 in the transmission 3 based on an inputted target speed Ts1. Moreover, the control arrangement 21 is configured to engage the selected starting gear g3 in the transmission 3, if not already engaged, and then accelerate the vehicle 2 from standstill with the starting gear g3 engaged in the transmission 3. In the illustrated example of FIG. 2, the control arrangement 21 engages the selected starting gear g3 in the transmission 3 at the point in time t2.

The control arrangement 21 may engage the starting gear g3 by sending a control signal to the transmission 3 of the vehicle 2. In more detail, in embodiments in which the transmission 3 comprises an automated manual transmission, the control arrangement 21 may engage the starting gear g3 by controlling movement of gear shifting linkages of the automated manual transmission. In embodiments in which the automated manual transmission comprises a clutch, the control arrangement 21 may engage the starting gear g3 by controlling the clutch of the automated manual transmission to an open state and then engage the starting gear g3 by controlling movement of gear shifting linkages of the automated manual transmission.

In embodiments in which the transmission 3 comprises an automatic transmission of conventional type with a torque converter and planetary gearsets, the control arrangement 21 may be configured to engage the starting gear g3 by hydraulically controlling operation of the torque converter and engagement of the planetary gearsets.

In the illustrated example of FIG. 2, the control arrangement 21 initiates acceleration of the vehicle 2 from standstill with the starting gear g3 engaged in the transmission 3 at the point in time t3. The control arrangement 21 may be configured to initiate acceleration of the vehicle 2 by initiating operation of the power source 5 and/or by controlling the above mentioned clutch to a closed state.

Since the control arrangement 21 is configured to select starting gear g3 based on the inputted target speed Ts1, the control arrangement 21 can enhance the comfort, smoothness, and driveability during acceleration phases of the vehicle 2. This is because conditions are provided for reducing, and potentially eliminating, the need for performing gear shifts gs1' during acceleration of the vehicle 2 to the target speed Ts1 as is further explained in the following.

According to the illustrated embodiments, the control arrangement 21 is configured to select the starting gear g3 to reduce the number of gear shifts gs1' needed for reaching the target speed Ts1. The selection of the starting gear g3 may be based on a calculated rotational speed of the power source 5 when the vehicle 2 reaches the target speed Ts1 with the selected starting gear g3. As an example, the selection of the starting gear g3 may be based on a calculated desired rotational speed of the power source 5 obtained when the vehicle 2 reaches the target speed Ts1 with the selected starting gear g3 engaged in the transmission 3. In this manner, the starting gear g3 can be selected such that no gear shifts are needed during an acceleration phase to the target speed Ts1, nor when the vehicle 2 has reached the target speed Ts. As an alternative, or in addition, the selection of the starting gear g3 may be based on a minimum required rotational speed of the power source 5 during an initial portion of an acceleration phase towards the target speed Ts1. As a further alternative, or in addition, the selection of the starting gear g3 may be based on a maximum amount of clutch slippage during an acceleration phase towards the target speed Ts1.

Moreover, the selection of the starting gear g3 may involve skipping a lower gear g1, g2 which is configured to provide a higher transmission ratio between the power source 5 and the driven wheels 27 than the selected starting gear g3. The skipped lower gear g1, g2 may also be referred to as a lower default starting gear. The lower gears g1, g2 are not indicated in FIG. 2 but are intended to represent a first gear g1 and a second gear g2, whereas the selected starting gear g3 constitutes a third gear g3 according to the example of FIG. 2.

A "gear g1, g2, g3" as referred to herein may also be referred to as a gear step. By skipping a lower gear g1, g2 which is configured to provide a higher transmission ratio between the power source 5 and the driven wheels 27 than the selected starting gear g3, the comfort, smoothness, and driveability can be enhanced during acceleration phases of the vehicle 2 while providing conditions for an energy efficient operation of the vehicle 2. This is because the lower transmission ratio of the selected starting gear g3, as compared to the skipped lower gear g1, g2, provides conditions for an energy efficient operation of the power source 5 of the vehicle 2 during acceleration towards the target speed Ts1.

In the example depicted in FIG. 2, the control arrangement 21 accelerates the vehicle 2 from standstill to the target speed Ts1 with the starting gear g3 engaged in the transmission 3. In other words, according to the embodiments illustrated in FIG. 2, the control arrangement 21 maintains the starting gear g3 engaged in the transmission 3 during the full acceleration from standstill at the point in time t3 to the target speed Ts1 at the point in time t5. In other words, in the example depicted in FIG. 2, the vehicle 2 reaches the target speed Ts1 at the point in time t5.

Moreover, as can be seen in FIG. 2, according to the illustrated embodiments, the control arrangement 21 is configured to perform an upshift gs1 in the transmission 3 when the vehicle 2 has reached the target speed Ts1. According to the example illustrated in FIG. 2, the upshift gs1 constitutes a gear change from the starting gear g3, i.e., from the third gear g3, to a fifth gear g5. Thus, according to the embodiments illustrated in FIG. 2, the control arrangement 21 skips a fourth gear g4 in the upshift gs1 performed when the vehicle 2 has reached the target speed Ts1.

According to the embodiments illustrated in FIG. 2, the control arrangement 21 initiates the upshift gs1 when the vehicle 2 reaches the target speed Ts1 at the point in time t5.

According to further embodiments, the control arrangement 21 may be configured to initiate the upshift gs1 a certain time after the vehicle 2 has reached the target speed Ts1 and/or at a certain speed above the target speed Ts1.

According to the embodiments illustrated in FIG. 2, the upshift gs1 is completed at the point in time t6. As can be seen in FIG. 2, a certain reduction in speed Vs is obtained between the indicated points in time t5 and t6. This reduction in speed Vs is caused by a temporary loss of power transfer between the power source 5 and the driven wheels 27 during the process of changing gears. This interruption happens because the power output of the power source 5 is momentarily reduced, and/or because the connection between the power source 5 and the input shaft of the transmission 3 is momentarily disengaged by the clutch of the transmission 3, during the upshift gs1.

During acceleration phases, torque interruption can lead to a noticeable break in the delivery of power, making the vehicle 2 momentarily feel less responsive. Moreover, this can affect driving comfort, as the smoothness of acceleration is disrupted. However, by performing the upshift gs1 when the vehicle 2 has reached the target speed Ts1, instead of during the acceleration to the target speed Ts1, the comfort, smoothness, and driveability of the vehicle 2 can be enhanced.

In more detail, according to the embodiments illustrated in FIG. 2, the control arrangement 21 is configured to abstain from performing an upshift gs1' in the transmission 3 at a default upshift speed ds1 during acceleration of the vehicle 2 to the target speed Ts1 if a difference d1 between the default upshift speed ds1 and the target speed Ts1 is below a threshold difference td2.

A default upshift speed ds1, as referred to herein, may be a preprogrammed gearshift speed for upshifting or downshifting under normal operating conditions of the vehicle 2. Such preprogrammed gearshift speed may be determined based on extensive testing and may be aimed at providing an optimal balance between acceleration, fuel economy, and drivetrain wear.

As an alternative, or in addition, a default upshift speed ds1, as referred to herein, may be determined, for example by the control arrangement 21, based on one or more of a number of maps, a number of matrixes, a number of algorithms, or the like, using one or more of a current rotational speed of the power source 5, a current vehicle acceleration or retardation demand, current load conditions, and a current driveline torque, as input data.

Moreover, according to some embodiments, the control arrangement 21 may be configured to adapt one or more preprogrammed gearshift speed/speeds according to the above based on driving style and conditions, learning over time to optimize for a driver's habits and preferences.

According to the example depicted in FIG. 2, the vehicle 2 reaches a default upshift speed ds1 at the point in time t4. Moreover, in the illustrated example of FIG. 2, the difference d1 between the default upshift speed ds1 and the target speed Ts1 is below the indicated threshold difference td1. As a result, the control arrangement 21 abstains from performing a gear shift gs1' in the transmission 3 when the vehicle 2 reaches the default upshift speed ds 1 at the point in time t4.

The feature that the control arrangement 21 is configured to abstain from performing a gear shift gs1' in the transmission 3 at a default upshift speed ds1 means that the control arrangement 21 is configured to skip, forgo, or refrain from executing a gear shift gs1' when the vehicle 2 reaches a default upshift speed ds1 if the difference d1 between the default upshift speed ds1 and the inputted target speed Ts1 is equal to, or below, the threshold difference td1.

As understood from the above described, the control arrangement 21 may be configured to input a current vehicle speed Vs and may be configured to compare the current vehicle speed Vs with default upshift speeds ds1, and perform a gear shift gs1 in the transmission 3 at a default upshift speed ds1 only if the difference d1 between the default upshift speed ds 1 and the target speed Ts1 exceeds the threshold difference td1.

According to some embodiments of the herein described, the selection of the starting gear may involve skipping a higher default starting gear which is configured to provide a lower transmission ratio between the power source 5 and the driven wheels 27 than the selected starting gear. Such a selection of starting gear may for example be performed upon input of low target speeds Ts1.

According to the illustrated embodiments, the control arrangement 21 is configured to select the starting gear g3 in the transmission 3 based on the inputted target speed Ts1 and the inputted vehicle acceleration demand, as is explained in greater detail in the following.

Figure 3:
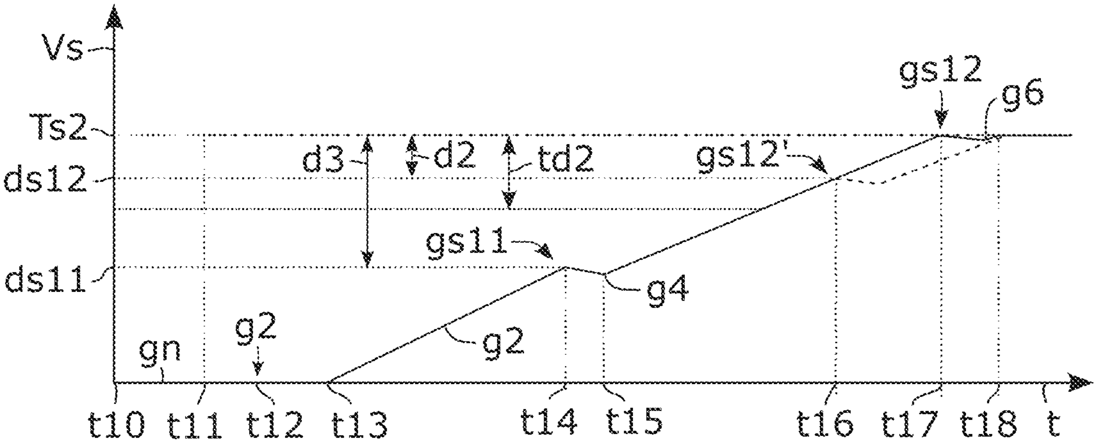
FIG. 3 illustrates a second graph with a horizontal axis indicating time and a vertical axis indicating a speed of the vehicle illustrated in FIG. 1, FIG. 4 schematically illustrates a method of controlling operation of a vehicle.

FIG. 3 illustrates a second graph with a horizontal axis indicating time t and a vertical axis indicating a speed Vs of the vehicle 2 illustrated in FIG. 1. Below, simultaneous reference is made to FIG. 1-FIG. 3, if not indicated otherwise.

A number of points in time t10-t18 is indicated in FIG. 3. At the point in time t10, the vehicle 2 is at standstill and a neutral gear gn is engaged in the transmission 3. The feature that the vehicle 2 is at standstill means that the vehicle 2 has zero speed Vs relative to a ground surface supporting the vehicle 2.

In the illustrated examples of FIG. 2 and FIG. 3, a neutral gear gn is engaged in the transmission 3 at the respective initial time t0, t10. However, obviously, another gear may be engaged in the transmission 3 at the respective initial time t0, t10, such as the first gear g1, a higher gear g2-g6, or a reverse gear. The transmission 3 is in a neutral state when the neutral gear gn is engaged in the transmission 3 meaning that there is no mechanical connection between an input shaft and an output shaft in the transmission 3 when the neutral gear gn is engaged in the transmission 3.

At the indicated point in time t11, the control arrangement 21 inputs a target speed Ts2 and a vehicle acceleration demand. As mentioned above, the target speed Ts2 and the vehicle acceleration demand may be inputted from the at least partially autonomous driving system 23, from the communication device 33, or from another type of device or system of the vehicle 2, such as a device or system comprising an input unit arranged in a driver environment 55 of the vehicle 2.

In the illustrated examples, the target speed Ts2 inputted at the point in time t11 in FIG. 3 is higher than the target speed Ts1 inputted at the point in time t1 in FIG. 2. Purely as examples, the target speed Ts1 inputted at the point in time t1 in FIG. 2 may be 30 km/h whereas the target speed Ts2 inputted at the point in time t11 in FIG. 3 may be 60 km/h.

Therefore, the control arrangement 21 selects a different starting gear g2 in the example depicted in FIG. 3 than in the example depicted in FIG. 2, namely the second gear g2.

Thus, also in the example depicted in FIG. 3, the selection of the starting gear g2 involves skipping a lower gear g1 which is configured to provide a higher transmission ratio between the power source 5 and the driven wheels 27 than the selected starting gear g2, namely the first gear g1.

As indicated above, according to the illustrated embodiments, the control arrangement 21 is configured to select the starting gear g3 in the transmission 3 based on the inputted vehicle acceleration demand. The selection may be based on a number of calculations indicating whether an inputted acceleration demand can be met with a starting gear g2 or not. Generally, a lower gear provides a higher acceleration capability due to the higher transmission ratio it provides as compared to a higher gear, and vice versa.

Accordingly, in the example depicted in FIG. 3, based on the input of the target speed Ts and the vehicle acceleration demand, the control arrangement 21 has determined that the vehicle acceleration demand can be met with the second gear g2 engaged in the transmission 3. However, if a higher vehicle acceleration demand were to be inputted at the point in time t1, the control arrangement 21 may have selected a lower starting gear, such as the first gear g1 in the illustrated example.

As explained above, the control arrangement 21 is configured to engage the selected starting gear g2 in the transmission 3 and then accelerate the vehicle 2 from standstill with the starting gear g2 engaged in the transmission 3. In the illustrated example of FIG. 3, the control arrangement 21 engages the selected starting gear g2 in the transmission 3 at the point in time t12.

As explained above, the control arrangement 21 may engage the starting gear g2 by sending a control signal to the transmission 3 of the vehicle 2. In more detail, in embodiments in which the transmission 3 comprises an automated manual transmission, the control arrangement 21 may engage the starting gear g2 by controlling movement of gear shifting linkages of the automated manual transmission. In embodiments in which the automated manual transmission comprises a clutch, the control arrangement 21 may engage the starting gear g2 by controlling the clutch of the automated manual transmission to an open state and then engage the starting gear g2 by controlling movement of gear shifting linkages of the automated manual transmission.

In embodiments in which the transmission 3 comprises an automatic transmission of conventional type with a torque converter and planetary gearsets, the control arrangement 21 may be configured to engage the starting gear g2 by hydraulically control operation of the torque converter and engagement of the planetary gearsets.

In the illustrated example of FIG. 3, the control arrangement 21 initiates acceleration of the vehicle 2 from standstill with the starting gear g2 engaged in the transmission 3 at the point in time t13. The control arrangement 21 may initiate acceleration of the vehicle 2 by initiating operation of the power source 5 and/or by controlling the above mentioned clutch to a closed state.

According to embodiments herein, the control arrangement 21 is configured to perform a gear shift gs11 in the transmission 3 at a default upshift speed ds11 if a difference d3 between the default upshift speed ds11 and the target speed Ts2 exceeds a threshold difference td2. That is, as can be seen in FIG. 3, the vehicle 2 reaches the default upshift speed ds11 at the point in time t14. Moreover, in the illustrated example of FIG. 3, the difference d3 between the default upshift speed ds11 and the target speed Ts2 exceeds the threshold difference td2. As a result, the control arrangement 21 initiates the gear shift gs11 when the vehicle 2 reaches the default upshift speed ds11 at the point in time t14. The gear shift gs11 is completed at the point in time t15.

As seen between the points in time t14 and t15, the gear shift gs11 causes a reduction in speed of the vehicle 2. This reduction in speed is caused by a temporary reduction in torque transfer between the power source 5 and the driven wheels 27 during the process of changing gears. This interruption happens because the power output of the power source 5 is momentarily reduced, and/or because the connection between the power source 5 and the input shaft of the transmission 3 is momentarily disengaged by the clutch of the transmission 3, during the upshift gs11.

The control arrangement 21 may be configured to perform gear shifts by reducing the power output of the power source 5, disengaging a current gear, engaging a new gear, and then increasing the power output of the power source 5. In embodiments in which the transmission 3 comprises a clutch, the control arrangement 21 may be configured to perform gear shifts by controlling the clutch of the transmission 3 to an open state, disengage a current gear, engage a new gear, and then control the clutched to a closed state. Moreover, the control arrangement 21 may be configured to restrict the power output of the power source 5 during such a process of changing gear.

In the illustrated example of FIG. 3, the gear shift gs11 constitutes a gear shift from the starting gear g2, i.e., the second gear g2, to the fourth gear g4. Accordingly, the gear shift gs11 illustrated in FIG. 3 involves a skipping of an intermediate gear, namely the third gear g3. Such skipping of intermediate gears may be based on a determination by the control arrangement 21 that an inputted vehicle acceleration demand can be met without using the intermediate gear.

The acceleration process towards the target speed Ts is resumed at the point in time t15. At the point in time t16, the vehicle 2 reaches a default upshift speed ds12. However, since the difference d2 between the default upshift speed ds12 and the target speed Ts2 is below the indicated threshold difference td2, the control arrangement 21 abstains from performing an upshift gs12' in the transmission 3 at a default upshift speed ds12.

Instead, as seen in FIG. 3, the vehicle 2 continues a smooth acceleration towards the target speed Ts2 until the target speed Ts2 is reached. Also in the example depicted in FIG. 3, the control arrangement 21 performs an upshift gs12 in the transmission 3 when the vehicle 2 has reached the target speed Ts2.

Moreover, also in the embodiments illustrated in FIG. 3, the control arrangement 21 initiates the upshift gs12 when the vehicle 2 reaches the target speed Ts2 at the point in time t17. According to further embodiments, the control arrangement 21 may be configured to initiate the upshift gs12 a certain time after the vehicle 2 has reached the target speed Ts2 and/or at a certain speed above the target speed Ts2. According to the embodiments illustrated in FIG. 2, the upshift gs1 is completed at the point in time t6.

The wording “upshift”, as used herein, refers to a gear shift from a lower gear to a higher gear. The default upshift speed ds11 provided with the reference sign “ds11” in FIG. 3 may also be referred to as a first default upshift speed ds11 and the default upshift speed ds12 provided with the reference sign "ds12" in FIG. 3 may also be referred to as a second default upshift speed ds12.

As understood from the above described, by abstaining from performing a gear shift gs1', gs12' if the difference d1, d2 between the default upshift speed ds1, ds12 and the target speed Ts1, Ts2 is equal to, or below, the threshold difference td1, td2, a smoother and more comfortable acceleration to the target speed Ts1, Ts2 can be obtained.

Furthermore, by abstaining from performing the gear shift gs1', gs12' if the difference d1, d2 between the default upshift speed ds1, ds12 and the target speed Ts1, Ts2 is equal to, or below, the threshold difference td1, td2, the target speed Ts1, Ts2 can be reached in a shorter time than would have been the case if the gear shift gs1', gs12' was performed at the default upshift speed ds1, ds12. In FIG. 2 and FIG. 3, this can be seen by the dashed lines starting at the respective abstained/skipped gear shift gs1', gs12'.

According to some embodiments, the control arrangement 21 is configured to input a vehicle acceleration demand and set the threshold difference td1, td2 based on the magnitude of the vehicle acceleration demand. In other words, according to such embodiments, the control arrangement 21 is configured to set the size of the threshold difference td1, td2 based on the magnitude of the inputted vehicle acceleration demand.

A vehicle acceleration demand, as referred to herein, may be inputted from a sensor configured to monitor the position of an actuator arranged in a driver environment 55 of the vehicle 2, such as an accelerator pedal. As an alternative, or in addition, a vehicle acceleration demand, as referred to herein, may be inputted from an at least partially autonomous driving system 23 of the vehicle 2, such as the at least partially autonomous driving system 23 of the vehicle 2 is schematically indicated in FIG. 1.

The at least partially autonomous driving system 23 may be a fully or partly autonomous driving system capable of driving the vehicle 2 in an at least partially autonomous manner based on the input from the sensor assembly 35.

According to some embodiments, the control arrangement 21 is configured to input the target speed Ts1, Ts2 from the at least partially autonomous driving system 23 of the vehicle 2.

According to some embodiments, the at least partially autonomous driving system 23 may be a cruise control system, i.e., a system configured to maintain a set speed. According to such embodiments, the target speed Ts1, Ts2, as referred to herein, may constitute a cruise control set speed, i.e., a set speed of the cruise control system.

According to some embodiments, the at least partially autonomous driving system 23, as referred to herein, is an adaptive cruise control system configured to maintain a following distance to a preceding vehicle based on data from the sensor assembly 35. According to such embodiments, the target speed Ts1, Ts2, as referred to herein, may constitute a target speed with respect to maintaining a distance to a preceding vehicle.

Furthermore, as indicated above, according to some embodiments, the control arrangement 21 is configured to input the vehicle acceleration demand from the at least partially autonomous driving system 23 of the vehicle 2.

Moreover, according to some embodiments, the control arrangement 21 is configured to input the target speed Ts1, Ts2, and/or the vehicle acceleration demand, using at least one of speed limit data, map data, curve speed cruise information, traffic information, and traffic light information. One or more of such data may be obtained using the sensor assembly 35 of the vehicle 2.

As an example, in embodiments in which the control arrangement 21 is configured to input the target speed Ts1, Ts2, and/or the vehicle acceleration demand, using speed limit data, the speed limit data may be obtained by speed limit sign recognition based on images captured by an image capturing device of the sensor assembly 35.

As another example, in embodiments in which the control arrangement 21 is configured to input the target speed Ts1, Ts2, and/or the vehicle acceleration demand, using map data, the target speed Ts1, Ts2, and/or the vehicle acceleration demand, may be set based on speed limits contained in the map data and a current position estimate of the vehicle 2. In other words, the control arrangement 21 may be configured to compare the current position estimate of the vehicle 2 with speed limits contained in the map data and determine the target speed Ts1, Ts2, and/or the vehicle acceleration demand, based thereon.

The control arrangement 21 may be configured to obtain the current position estimate of the vehicle 2 from a vehicle positioning device. Such a vehicle positioning device may for example utilize a space-based satellite navigation system such as a Global Positioning System (GPS), The Russian GLObal NAvigation Satellite System (GLONASS), European Union Galileo positioning system, Chinese Compass navigation system, or Indian Regional Navigational Satellite System.

Furthermore, according to the illustrated embodiments, the vehicle 2 comprises a communication device 33 operably connected to the control arrangement 21. According to these embodiments, the control arrangement 21 may be configured to input the target speed Ts1, Ts2, and/or the vehicle acceleration demand, using data received from an external sender 31 by the communication device 33.

The data received from the external sender 31 may contain the actual target speed Ts1, Ts2, and/or the vehicle acceleration demand, which is/are then used by the control arrangement 21 in the control explained herein. As an alternative, or in addition, the data received from the external sender 31 may be indicative of one or more of speed limit data, map data, curve speed cruise information, traffic information, and traffic light information, and wherein the control arrangement 21 is configured to set the target speed Ts1, Ts2, and/or the vehicle acceleration demand, based on the received data.

As previously mentioned, the particular gears g1-g6 outlined above should only be seen as examples. According to embodiments herein, the transmission 3 is controllable between at least two different gears g1-g6 to provide at least two different transmission ratios between the power source 5 and the driven wheels 27 of the vehicle 2. For example, the transmission 3 may be controllable between 4-16 different gears to provide 4-16 different transmission ratios between the power source 5 and the driven wheels 27 of the vehicle 2. A gear shift, as referred to herein, may be a gear shift between two of such gear steps. The gear shift can occur between any two gear steps, not necessarily ones that are next to each other in sequence.

Moreover, the examples of FIG. 2 and FIG. 3 illustrate acceleration of the vehicle 2 in the forward moving direction fd of the vehicle 2 indicated in FIG. 1. In other words, the target speeds Ts1, Ts2 illustrated in FIG. 2 and FIG. 3 constitute target speeds Ts1, Ts2 for movement of the vehicle 2 in the forward moving direction fd thereof. Likewise, the inputted vehicle acceleration demands constitute demands for vehicle acceleration in the forward moving direction fd.

However, according to some embodiments, a target speed, as referred to herein, may constitute a target speed for movement of the vehicle 2 in the reverse moving direction rd thereof. Similarly, an inputted vehicle acceleration demand may constitute a demand for vehicle acceleration in the reverse moving direction rd of the vehicle 2.

In embodiments in which the power source 5 is an electric propulsion machine, the above explained gears g1-g6 may be utilized for propulsion in the reverse moving direction rd of the vehicle 2, indicated in FIG. 1, by reversing the propulsion direction of the electric propulsion machine.

In embodiments in which the power source 5 is an internal combustion engine, the transmission 3 may be controllable between at least two different reverse gears to provide at least two different transmission ratios between the power source 5 and the driven wheels 27 of the vehicle 2 upon propulsion of the vehicle 2 in the reverse moving direction rd.

Accordingly, in summary, the control arrangement 21 may be configured to select a starting gear in the transmission 3 for reverse propulsion of the vehicle 2 based on an inputted target speed, and accelerate the vehicle 2 in the reverse moving direction rd from standstill with the starting gear engaged in the transmission 3.

Figure 4:
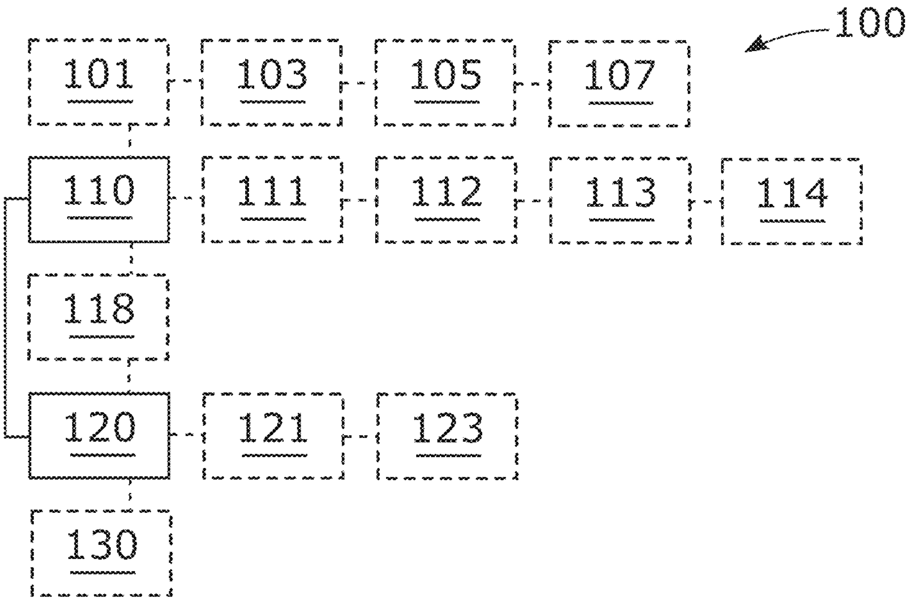

FIG. 4 schematically illustrates a method 100 of controlling operation of a vehicle. The vehicle may be a vehicle 2 according to the embodiments explained with reference to FIG. 1-FIG. 3. Therefore, below, simultaneous reference is made to FIG. 1-FIG. 4, if not indicated otherwise.

The method 100 is a method of controlling operation of a vehicle 2, wherein the method 100 is performed by a control arrangement 21, and wherein the vehicle 2 comprises a transmission 3 and a power source 5 operably connected to driven wheels 27 of the vehicle 2 via the transmission 3. The transmission 3 is controllable between at least two different gears g1-g6 to provide at least two different transmission ratios between the power source 5 and the driven wheels 27 of the vehicle 2. The method 100 comprises the steps of:

selecting 110 a starting gear g3, g2 in the transmission 3 based on an inputted target speed Ts1, Ts2, and then accelerating 120 the vehicle 2 from standstill with the starting gear g3, g2 engaged in the transmission 3.

As illustrated in FIG. 4, the method 100 may comprise the step of:

engaging 118 the selected starting gear g3, g2 in the transmission 3 before performing the step of accelerating 120 the vehicle 2 from standstill.

According to some embodiments, the method 100 comprises:

selecting 112 the starting gear g3, g2 to reduce the number of gear shifts gs1', gs11, gs12' needed for reaching the target speed Ts1, Ts2.

Moreover, as illustrated in FIG. 4, the method 100 may comprise the step of:

accelerating 121 the vehicle 2 from standstill to the target speed Ts1 with the starting gear g3 engaged in the transmission 3.

According to some embodiments, the step of selecting 110 the starting gear g3 comprises:

selecting 113 the starting gear g3 based on a calculated rotational speed of the power source 5 when the vehicle 2 reaches the target speed Ts1 with the selected starting gear g3.

Furthermore, as illustrated in FIG. 4, the method 100 may comprise the step of:

performing 130 an upshift gs1, gs12 in the transmission 3 when the vehicle 2 has reached the target speed Ts1, Ts2.

According to some embodiments, the method 100 comprises the step of:

abstaining 123 from performing an upshift gs1', gs12' in the transmission 3 at a default upshift speed ds1, ds12 during acceleration of the vehicle 2 to the target speed Ts1, Ts2 if a difference d1, d2 between the default upshift speed ds1, ds12 and the target speed Ts1, Ts2 is below a threshold difference td1, td2.

Moreover, according to some embodiments, the method 100 comprises the step of:

inputting 101 a vehicle acceleration demand, and wherein the step of selecting 110 the starting gear g3, g2 comprises:

selecting 111 the starting gear g3, g2 in the transmission 3 based on the inputted target speed Ts1, Ts2 and the inputted vehicle acceleration demand.

Moreover, as indicated in FIG. 4, the method 100 may comprise the steps of:

inputting 101 a vehicle acceleration demand, and setting 103 the threshold difference td1, td2 based on the magnitude of the vehicle acceleration demand.

According to some embodiments, the step of selecting 110 the starting gear g3, g2 involves:

skipping 114 a lower gear g1 which is configured to provide a higher transmission ratio between the power source 5 and the driven wheels 27 than the selected starting gear g3, g2.

Moreover, according to some embodiments, the method 100 comprises the step of:

inputting 105 the target speed Ts1, Ts2 from an at least partially autonomous driving system 23 of the vehicle 2.

Alternatively, or additionally, the method 100 may comprise the step of inputting 107 the target speed Ts1, Ts2 using at least one of speed limit data, map data, curve speed cruise information, traffic information, traffic light information, and data from an external sender 31.

The method 100, as referred to herein, may also be referred to as a method of selecting starting gear g3, g2 in a transmission 3 of a vehicle 2.

It will be appreciated that the various embodiments described for the method 100 are all combinable with the control arrangement 21 as described herein. That is, the control arrangement 21 may be configured to perform any one of the method steps 101, 103, 105, 107, 110, 111, 112, 113, 114, 118, 120, 121, 123, and 130.

Figure 5:
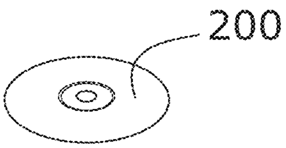
FIG. 5 illustrates a computer-readable medium.

FIG. 5 illustrates a computer-readable medium 200 comprising instructions which, when executed by a computer, cause the computer to carry out the method 100 according to some embodiments of the present disclosure. According to some embodiments, the computer-readable medium 200 comprises a computer program comprising instructions which, when the program is executed by a computer, cause the computer to carry out the method 100 according to some embodiments. The computer may be comprised in the control arrangement 21.

One skilled in the art will appreciate that the method 100 of controlling operation of a vehicle 2 may be implemented by programmed instructions. These programmed instructions are typically constituted by a computer program, which, when it is executed in the control arrangement 21, ensures that the control arrangement 21 carries out the desired control, such as the method steps 101, 103, 105, 107, 110, 111, 112, 113, 114, 118, 120, 121, 123, and 130 described herein. The computer program is usually part of a computer program product which comprises a suitable digital storage medium on which the computer program is stored, such as the computer-readable medium 200 illustrated in FIG. 5. In other words, the computer program product may be a computer readable medium 200 and the computer program may be stored in the computer readable medium 200.

The control arrangement 21 may comprise a computer which may take the form of substantially any suitable type of hardware or hardware/firmware device implemented using processing circuity such as, but not limited to, a processor, Central Processing Unit (CPU), a controller, an arithmetic logic unit (ALU), a digital signal processor, an Application Specific Integrated Circuit (ASIC), a circuit for digital signal processing (digital signal processor, DSP), a microcomputer, a field programmable gate array (FPGA), a System-on-Chip (SoC), a programmable logic unit, a microprocessor, an application-specific integrated circuit, or any other device capable of electronically performing operations in a defined manner, or other processing logic that may interpret and execute instructions. The herein utilised expression "computer" may represent a processing circuitry comprising a plurality of processing circuits, such as, e.g., any, some or all of the ones mentioned above.

The control arrangement 21 may further comprise a memory unit, wherein the computer may be connected to the memory unit, which may provide the computer with, for example, stored program code and/or stored data which the computer may need to enable it to do calculations. The computer may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the vehicle 2 for receiving and/or sending input and output signals. These input and output signals may comprise waveforms, pulses, or other attributes which the input signal receiving devices can detect as information and which can be converted to signals processable by the control arrangement 21. These signals may then be supplied to the computer. One or more output signal sending devices may be arranged to convert calculation results from the computer to output signals for conveying to other parts of the vehicle's control system and/or the component or components for which the signals are intended. Each of the connections to the respective components of the vehicle 2 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the vehicle 2 comprises a control arrangement 21 but might alternatively be implemented wholly or partly in two or more control arrangements, two or more control arrangements, or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles and engines of the type here concerned are therefore often provided with significantly more control arrangements than depicted in FIG. 1, as one skilled in the art will surely appreciate.

The computer-readable medium 200 may be provided for instance in the form of a data carrier carrying computer program code for performing at least some of the method steps 101, 103, 105, 107, 110, 111, 112, 113, 114, 118, 120, 121, 123, and 130 according to some embodiments of the method 100 when being loaded into one or more computers of the control arrangement 21. The data carrier may be, e.g. a CD ROM disc, as is illustrated in FIG. 5, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. Accordingly, in some embodiments, the computer-readable medium 200 may be a non-transitory computer-readable medium, such as a tangible electronic, magnetic, optical, infrared, electromagnetic, and/or semiconductor system, apparatus, and/or device. The computer-readable medium 200 may furthermore be provided as computer program code on a server and may be downloaded to the control arrangement 21 remotely, e.g., over an Internet or an intranet connection, or via other wired or wireless communication systems.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of controlling operation of a vehicle, wherein the method is performed by a control arrangement, wherein the vehicle comprises a transmission and a power source operably connected to driven wheels of the vehicle via the transmission, wherein the transmission is controllable between at least two different gears to provide at least two different transmission ratios between the power source and the driven wheels of the vehicle, and wherein the method comprises the steps of:

selecting a starting gear in the transmission based on an inputted target speed;

accelerating the vehicle from standstill with the starting gear engaged in the transmission; and abstaining from performing an upshift in the transmission at a default upshift speed during acceleration of the vehicle to the target speed if a difference between the default upshift speed and the target speed is below a threshold difference.

2. The method according to claim 1, wherein the method further comprises:

selecting the starting gear to reduce the number of gear shifts needed for reaching the target speed.

3. The method according to claim 1, wherein the step of accelerating the vehicle comprises:

accelerating the vehicle from standstill to the target speed with the starting gear engaged in the transmission.

4. The method according to claim 1, wherein the step of selecting the starting gear comprises:

selecting the starting gear based on a calculated rotational speed of the power source when the vehicle reaches the target speed with the selected starting gear.

5. The method according to claim 1, wherein the method further comprises the step of:

performing an upshift in the transmission when the vehicle has reached the target speed.

6. The method according to claim 1, wherein the method further comprises the step of:

inputting a vehicle acceleration demand; and wherein the step of selecting the starting gear comprises:

selecting the starting gear in the transmission based on the inputted target speed and the inputted vehicle acceleration demand.

7. The method according to claim 1, wherein the step of selecting the starting gear involves:

skipping a lower gear which is configured to provide a higher transmission ratio between the power source and the driven wheels than the selected starting gear.

8. The method according to claim 1, wherein the method further comprises the step of:

inputting the target speed from an at least partially autonomous driving system of the vehicle.

9. The method according to claim 1, wherein the method further comprises the step of inputting the target speed, where the inputted target speed is based on at least one of:

speed limit data, map data, and data from an external sender.

10. A computer program product stored on a non-transitory computer-readable medium, said computer program product for controlling operation of a vehicle, wherein the vehicle comprises a transmission and a power source operably connected to driven wheels of the vehicle via the transmission, wherein the transmission is controllable between at least two different gears to provide at least two different transmission ratios between the power source and the driven wheels of the vehicle, and wherein said computer program product comprising computer instructions to cause one or more processors to:

select a starting gear in the transmission based on an inputted target speed;

accelerate the vehicle from standstill with the starting gear engaged in the transmission; and abstaining from performing an upshift in the transmission at a default upshift speed during acceleration of the vehicle to the target speed if a difference between the default upshift speed and the target speed is below a threshold difference.

11. A control arrangement configured to control operation of a vehicle, wherein the vehicle comprises a transmission and a power source operably connected to driven wheels of the vehicle via the transmission, wherein the transmission is controllable between at least two different gears to provide at least two different transmission ratios between the power source and the driven wheels of the vehicle, and wherein the control arrangement is configured to:

select a starting gear in the transmission based on an inputted target speed;

accelerate the vehicle from standstill with the starting gear engaged in the transmission; and abstaining from performing an upshift in the transmission at a default upshift speed during acceleration of the vehicle to the target speed if a difference between the default upshift speed and the target speed is below a threshold difference.

12. The control arrangement according to claim 11 further configured to:

select the starting gear to reduce the number of gear shifts needed for reaching the target speed.

13. The control arrangement according to claim 11, wherein accelerating the vehicle comprises:

accelerating the vehicle from standstill to the target speed with the starting gear engaged in the transmission.

14. The control arrangement according to claim 11, wherein selecting the starting gear comprises:

selecting the starting gear based on a calculated rotational speed of the power source when the vehicle reaches the target speed with the selected starting gear.

15. The control arrangement according to claim 11 further configured to:

perform an upshift in the transmission when the vehicle has reached the target speed.

16. A vehicle comprising:

a transmission;

a power source operably connected to driven wheels of the vehicle via the transmission, wherein the transmission is controllable between at least two different gears to provide at least two different transmission ratios between the power source and the driven wheels of the vehicle; and a control arrangement configured to:

select a starting gear in the transmission based on an inputted target speed;

accelerate the vehicle from standstill with the starting gear engaged in the transmission;

abstaining from performing an upshift in the transmission at a default upshift speed during acceleration of the vehicle to the target speed if a difference between the default upshift speed and the target speed is below a threshold difference.

17. The vehicle according to claim 16, wherein the power source is an electric machine.

18. The vehicle according to claim 16, wherein the transmission is an automated manual transmission.

19. The vehicle according to claim 16, wherein the vehicle is a heavy road vehicle.

* * * * *